(12) United States Patent
Gschwind et al.

(10) Patent No.: US 9,513,916 B2
(45) Date of Patent: *Dec. 6, 2016

(54) INSTRUCTION MERGING OPTIMIZATION (71) Applicant: International Business Machines Corporation, Armonk, NY (US)

(72) Inventors: Michael K. Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 526 days.

This patent is subject to a terminal disclaimer.

(21) Appl. No.: 13/790,632

(22) Filed: Mar. 8, 2013

(65) Prior Publication Data

US 2013/0262841 A1 Oct. 3, 2013

Related U.S. Application Data

(63) Continuation of application No. 13/432,537, filed on Mar. 28, 2012.

(51) Int. Cl.
*G06F 9/30* (2006.01)
*G06F 9/38* (2006.01)

(52) U.S. Cl.
CPC ......... *G06F 9/30181* (2013.01); *G06F 9/3017* (2013.01); *G06F 9/384* (2013.01); *G06F 9/3836* (2013.01)

(58) Field of Classification Search
CPC ............. G06F 9/3017; G06F 9/30181; G06F 9/3836; G06F 9/384
See application file for complete search history.

(56) References Cited

U.S. PATENT DOCUMENTS

| | | | |
|---|---|---|---|
| 6,338,136 B1 * | 1/2002 | Col et al. | 712/221 |
| 7,398,372 B2 * | 7/2008 | Samra et al. | 712/209 |
| 8,082,430 B2 * | 12/2011 | Valentine et al. | 712/245 |
| 2004/0139429 A1 | 7/2004 | Ronen et al. | |
| 2005/0289529 A1 | 12/2005 | Almog et al. | |
| 2006/0101241 A1 | 5/2006 | Curran et al. | |
| 2009/0204791 A1 * | 8/2009 | Luick | G06F 9/3804 712/207 |

FOREIGN PATENT DOCUMENTS

CN 1952897 A 4/2007

OTHER PUBLICATIONS

International Search Report No. PCT/IB2013/051342 dated Jul. 18, 2013; pp. 8.

* cited by examiner

*Primary Examiner* — Benjamin Geib
(74) *Attorney, Agent, or Firm* — Cantor Colburn LLP; William A. Kinnaman, Jr.

(57) ABSTRACT

A computer-implemented method includes determining that two or more instructions of an instruction stream are eligible for optimization, where the two or more instructions include a memory load instruction and a data processing instruction to process data based on the memory load instruction. The method includes merging, by a processor, the two or more instructions into a single optimized internal instruction and executing the single optimized internal instruction to perform a memory load function and a data processing function corresponding to the memory load instruction and the data processing instruction.

6 Claims, 6 Drawing Sheets

INSTRUCTION MERGING OPTIMIZATION

CROSS-REFERENCE TO RELATED APPLICATIONS

This is a continuation application of and claims priority from U.S. application Ser. No. 13/432,458, filed on Mar. 28, 2012, the entire contents of which are incorporated herein by reference.

BACKGROUND

Processors execute streams of instructions to perform data processing, storage, and control operations. The processors may execute the instructions by fetching machine instructions from a data storage, generating internal instructions based on the machine instructions, and executing the internal instructions to perform operations to control a system including the processor.

SUMMARY

According to one embodiment of the present disclosure, a computer system for optimizing instructions includes a processor including an instruction execution unit configured to execute instructions and an instruction optimization unit configured to optimize two or more instructions and memory to store two or more machine instructions to be executed by the instruction execution unit. The computer system is configured to perform a method including analyzing the two or more machine instructions from among a stream of instructions to be executed by the instruction execution unit, the two or more machine instructions including a memory load instruction and a data processing instruction to perform a data processing function based on the memory load instruction, identifying the two or more machine instructions as being eligible for optimization, merging the first and second machine instructions into a single optimized internal instruction, and executing the single optimized internal instruction to perform a memory load function and a data processing function corresponding to the memory load instruction and the data processing instruction.

According to another embodiment of the present disclosure, computer program product for implementing instruction optimization. The computer program product includes a tangible storage medium readable by a processing circuit and storing instructions for execution by the processing circuit for performing a method. The method may include determining that at least two machine instructions of an instruction stream are eligible for optimization, the at least two machine instructions including a memory load instruction and a data processing instruction to process data based on the memory load instruction, merging, by a processor, the at least two machine instructions into a single optimized internal instruction based on determining that the at least two machine instructions are eligible for optimization, and executing the single optimized internal instruction to perform a memory load function and a data processing function corresponding to the memory load instruction and the data processing instruction.

According to yet another embodiment of the present disclosure, a computer-implemented method may include determining that two or more instructions of an instruction stream are eligible for optimization, the two or more instruction including a memory load instruction and a data processing instruction to process data based on the memory load instruction, merging, by a processor, the two or more instructions into a single optimized internal instruction, and executing the single optimized internal instruction to perform a memory load function and a data processing function corresponding to the memory load instruction and the data processing instruction.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
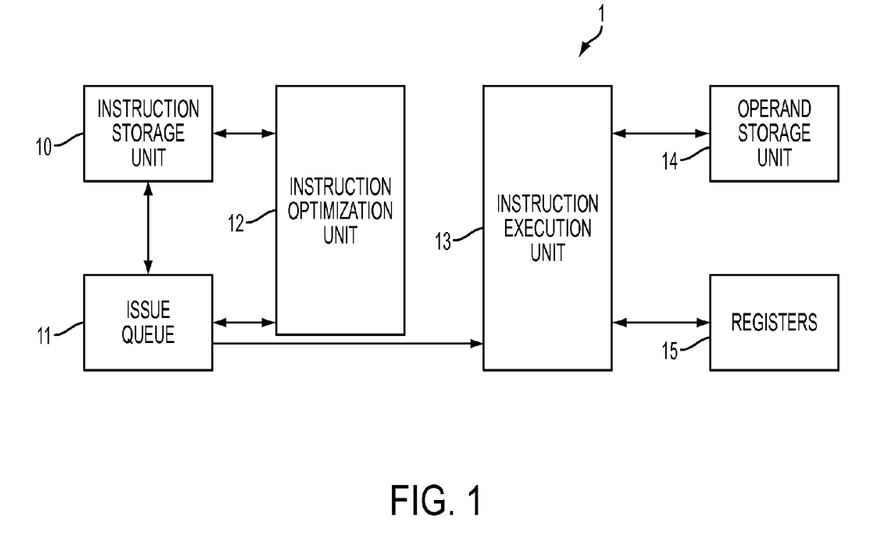
FIG. 1 depicts a block diagram of a system for optimizing internal instructions according to an embodiment of the present disclosure.

With reference to FIG. 1, a system 1 for optimizing instructions includes an instruction storage unit 10, an issue queue 11, an instruction optimization unit 12, an instruction execution unit 13, an operand storage unit 14, and registers 15. The system 1 is not limited to the above elements or components, but these components are provided for purposes of description. Other components may be added, and one or more of the above components may be omitted according to systems within the scope of the present disclosure.

The instruction storage unit 10 stores instructions to be executed by the instruction execution unit 13. The instructions may be stored in the instruction storage unit 10 according to any architecture, including based on when the instructions were programmed, randomly, based on when the instructions were called or accessed by the system 1, or according to any other design parameters, requirements, or architectures. In one embodiment, the instruction storage unit 10 stores machine instructions, and in another embodiment, the instruction storage unit 10 stores instructions that are generated based on the machine instructions.

The issue queue 11 includes a predetermined number of slots to store instructions that are in-line to be executed by the instruction execution unit 13. The instructions in the issue queue 11 advance through the queue when an instruction at the front of the queue is executed. The advancement of the instructions may be realized by a pointer pointing to a next instruction, by electrically reading the instructions from the queue and re-writing the instructions back into the queue in a new order, or by any other process. In one embodiment, the issue queue 11 stores machine instructions, and in another embodiment, the issue queue stores internal instructions that are generated based on the machine instructions.

In some embodiments of the present disclosure, multiple instructions in the issue queue 11 are analyzed, such as by the instruction execution unit 13, to determine whether a plurality of instructions in the issue queue 11 may be executed in parallel to increase a speed at which the system 1 completes sets of instructions. Analysis of each one of the instructions in the slots of the issue queue 11 takes a predetermined amount of time, such that increasing a depth of the issue queue 11 to increase a number of instructions in the issue queue 11 increases a latency of the system 1.

In embodiments of the present disclosure, the instruction optimization unit 12 analyzes a plurality of instructions in a stream of instructions to determine whether the instructions are eligible for optimization. The stream of instructions may be stored in, and accessed from, the instruction storage unit 10 or the issue queue 11. For example, in one embodiment, machine instructions stored in the instruction storage unit 10 or the issue queue 11 are analyzed to determine whether they are eligible for optimization. If they are determined to be eligible for optimization, the instructions may be optimized to generate an optimized internal instruction, and the optimized internal instruction may be stored in the issue queue 11. In another embodiment, internal instructions stored in the issue queue 11 may be analyzed to determine eligibility for optimization. If the internal instructions are determined to be eligible for optimization, the internal instructions may be optimized to generate an optimized internal instruction, and the optimized internal instruction may be stored in the issue queue 11.

The optimization may occur, for example, at a time when an instruction is decoded. When the instructions are determined to be eligible for optimization, the instruction optimization unit 12 merges the instructions into a single optimized internal instruction that includes the separate internal instructions. The single optimized internal instruction may be stored in only one slot of the issue queue 11. When performing register renaming, the single optimized internal instruction may use a single target rename register to reflect the result of both the first and second internal instructions that have been combined, thereby reducing consumption of scarce rename register resources.

During execution of the internal instructions, the instruction execution unit 13 accesses an instruction at the front of the issue queue 11 and executes the instruction by accessing one or more operands from an operand storage unit 14 or registers 15 and by storing a result in one or more of the operand storage unit 14 and the registers 15. When the instruction executed by the instruction execution unit 13 is an optimized internal instruction, the instruction execution unit 13 may execute the optimized internal instruction twice—once to execute the first instruction in the optimized internal instruction and again to execute the second instruction in the optimized internal instruction.

In embodiments of the present disclosure, the two or more internal instructions that are analyzed for optimization may include at least one I/O instruction to input data to and/or output data from a location in memory and at least one data processing instruction, such as an instruction to move data from one location to another, to perform an arithmetic function, or any other data processing function. In embodiments of the present disclosure, the data that is the subject of the I/O instruction may also be the subject of the data processing instruction. For example, a first internal instruction may be a load instruction to load an operand to a register, and the data processing instruction may be an arithmetic instruction, or any other instruction to modify or manipulate the operand. In the present specification and claims, a data processing instruction is defined as a function that modifies or manipulates an operand, performs a comparison based on the operand, or otherwise uses the operand to generate a result that may be different from the operand. As defined, data processing excludes a load instruction, which merely places an operand at defined location.

According to one embodiment of the present disclosure, the two or more internal instructions are compatible with a reduced instruction set computer (RISC) architecture. In a RISC architecture, internal instructions generally last no longer than one memory cycle, and a function is generally divided into two internal instructions: an I/O instruction and a data processing instruction. For example, an adding function requires a load instruction to load an operand into a register and an add instruction add a value to the operand and store the result in a register. In embodiments of the present disclosure, the instruction optimization unit 12 analyzes two internal instructions that together complete a single RISC function, such as an arithmetic function or a function to move data from one location to another, and optimizes the two RISC-compatible internal instructions to form one optimized internal instruction, which may be stored as one instruction in the issue queue 10.

Figure 2:
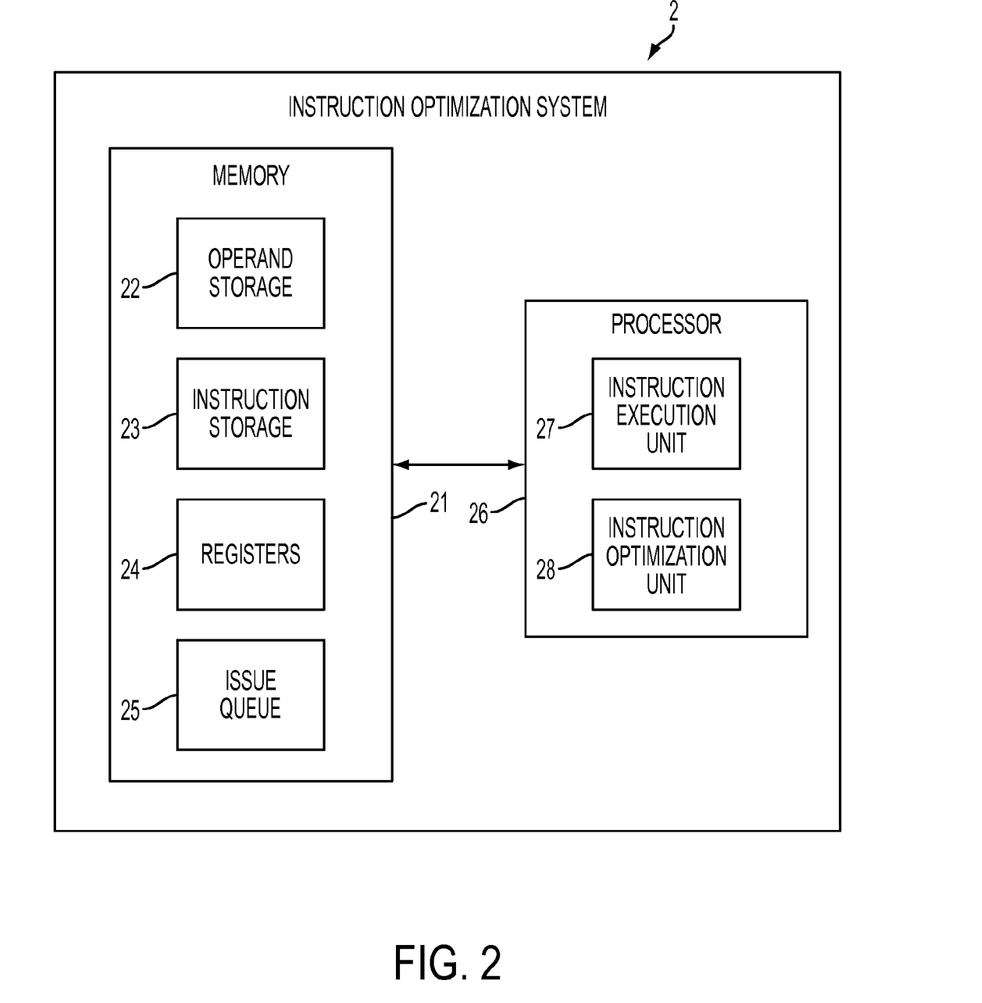
FIG. 2 depicts a configuration of a system for optimizing internal instructions according to an embodiment of the present disclosure.

FIG. 2 illustrates a physical configuration of a system 2 for optimizing instructions according to an embodiment of the present disclosure. The system 2 includes memory 21 and a processor 26. The memory 21 stores operands in an operand storage 22, instructions in an instruction storage 23, data in registers 24, and internal instructions in the issue queue 25. In embodiments of the present disclosure, the memory 21 may include one memory chip, such as a random access memory (RAM) chip, a plurality of memory chips, different types of memory, such as volatile memory, non-volatile memory, flash memory, cache memory, or any other type of data storage. The operand storage 22, instruction storage 23, registers 24, and issue queue 25 may be located in a same type of memory, in a same memory chip, or in a same integrated circuit. Alternatively, one or more of the operand storage 22, instruction storage 23, registers 24, and issue queue 25 may be located in a different type of memory, a different memory chip, or in a different integrated circuit than another one of the operand storage 22, instruction storage 23, registers 24, and issue queue 25. For example, while the instruction storage 23 may comprise RAM or read-only memory (ROM), the issue queue 25 may comprise cache memory.

The processor 26 includes an instruction execution unit 27 and an instruction optimization unit 28. In embodiments of the present disclosure, the instruction execution unit 27 and the instruction optimization unit 28 may include hard-wired circuitry in the processor 26, software accessed by processing elements of the processor 26 to control operation of the processor 26, one or more arithmetic logic units, other logic, cache memory, or any other circuitry to cause the processor to optimize and execute internal instructions.

Figure 3:
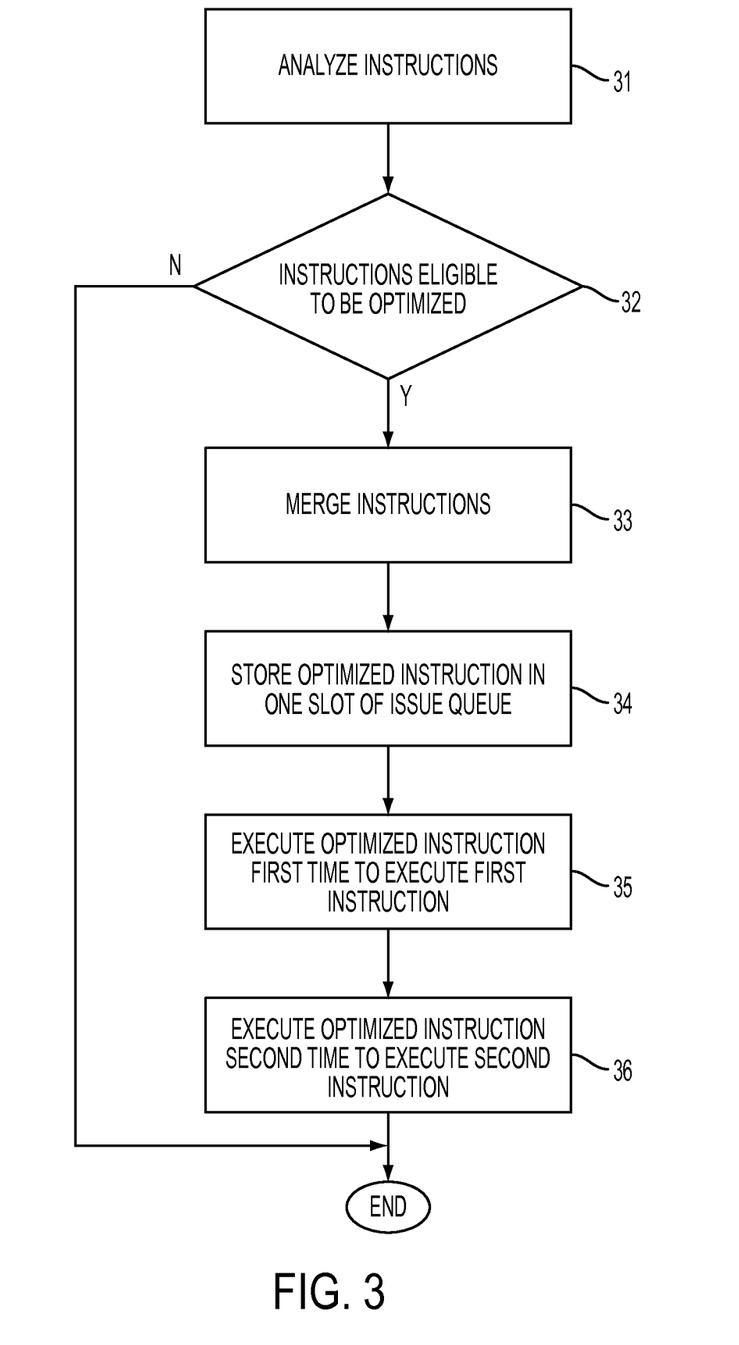
FIG. 3 depicts a process flow for optimizing internal instructions according to an embodiment of the present disclosure.

FIG. 3 illustrates a method of optimizing instructions according to an embodiment of the present disclosure. The method may be performed in a system 2 having a configuration illustrated in FIG. 2, or in any other system configured to perform the method. It is understood that while blocks 31-36 are illustrated in FIG. 3, embodiments of the present disclosure encompass methods in which one or more of the blocks 31-36 is omitted or modified, or in which additional blocks are added.

In block 31, a plurality of instructions is analyzed for optimization 31. The analyzed instructions may include machine instructions or internal instructions generated based on the machine instructions. In embodiments of the present disclosure, the plurality of instructions includes a load instruction and a data processing instruction to process an operand that is the subject of the load instruction.

Figure 4:
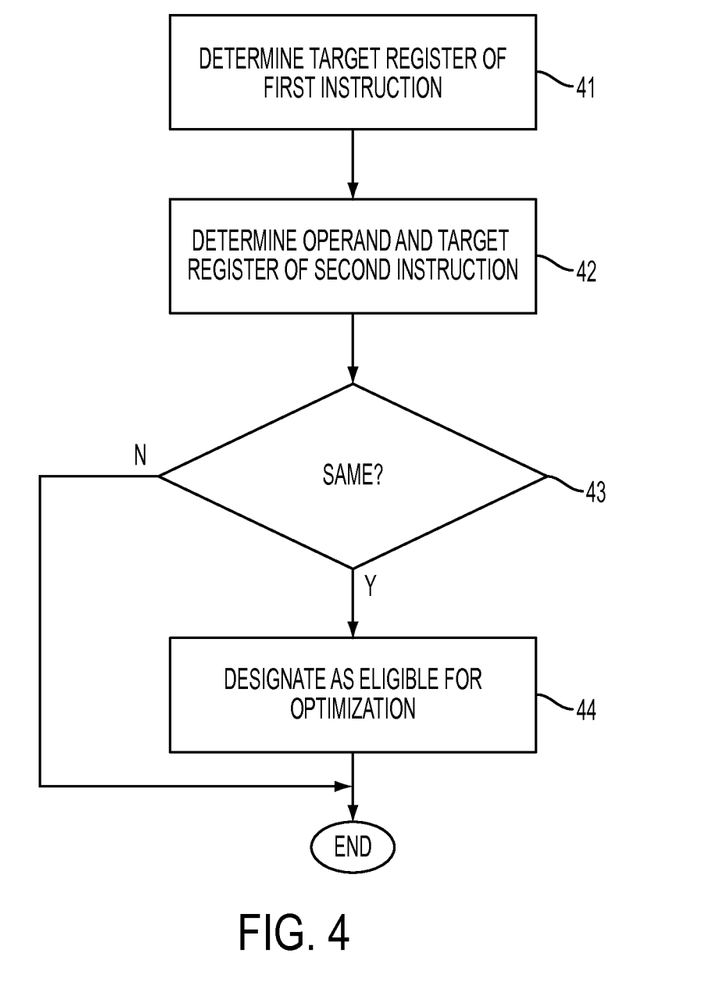
FIG. 4 depicts a process flow for determining whether internal instructions are eligible for optimization according to one embodiment.

FIG. 4 illustrates one embodiment of determining whether instructions are eligible to be optimized. It is understood that while blocks 41-44 are illustrated in FIG. 4, embodiments of the present disclosure encompass methods in which one or more of the blocks 41-44 is omitted or modified, or in which additional blocks are added. In block 41, a target destination or register of a first instruction is determined. In embodiments of the present disclosure, the first instruction may be a load instruction to load an operand into the target destination or register. In block 42, a location of an operand and a target destination or register of a second instruction is determined. In embodiments of the present disclosure, the second instruction may be downstream from the first instruction in a stream of instructions. In addition, the second instruction may be an instruction to be executed immediately after executing the first instruction.

In block 43, it is determined whether the target destination or register of the first and second instructions is the same, and whether the target destination or register is the same as the location of an operand of the second instruction. If so, in block 44 the instructions are designated as being eligible for optimization. If the first and second internal instructions are not eligible for optimization based on the analysis of block 43, then the process ends. In one embodiment of the present disclosure, block 43 determines whether the second instruction is a data processing instruction that accesses an operand at the target destination or register of the first instruction for processing.

Although the embodiment of FIG. 4 describes determining whether instructions are eligible for optimization based on a destination register of the operations, other criteria may determine whether instructions are eligible for optimization. In particular, instructions may be eligible for optimization any time an accurate execution of the second instruction depends upon the outcome of the first instruction. For example, if a second operation uses data in a register written to by a first operation and writes to that register, then performing the second operation prior to performing the first operation may generate a faulty result in the second operation. Since the second operation depends upon the execution of the first operation, the operations may be eligible to be optimized.

In one embodiment, the first and second instructions are adjacent to each other in the issue queue, such that one would be executed immediately after the other if executed in order from first to last in the issue queue. In one embodiment, only the source of the operand of the second instruction is compared to the target register or destination of the first instruction. In another embodiment, only the target destination or register of the second instruction is compared to the target register or destination of the first instruction.

In one embodiment, the operands locations and target destinations or registers of the instructions in the issue queue may be analyzed, and the first and second instructions may be determined to be eligible for optimization when no instruction between the first instruction and the second instruction in the issue queue writes to an operand location accessed by the second instruction, and no instruction between the first instruction and the second instruction in the issue queue reads from the target destination or register of the first instruction.

In one embodiment, a determination may be made whether the instructions are of types that are eligible to be combined. For example, in one embodiment with multiple issue queues, instructions may only be combined if they are issued from the same issue queue. Thus, in one embodiment, vector instructions and floating point instructions may be combined with one another, and integer instruction may be combined, but not integer and vector instructions. Similarly, issue logic may restrict other combinations of instructions.

Referring again to FIG. 3, if it is determined in operation 32 that the analyzed instructions are eligible to be optimized, the instructions are merged in operation 33 to form one optimized internal instruction including the instruction information of each of the analyzed instructions. The optimized internal instruction may be arranged according to predetermined programming parameters such that an instruction executing device recognizes the first portion of the optimized internal instruction as being a first instruction to be executed first, and the second portion of the optimized internal instruction as being a second instruction to be executed second.

In one embodiment, the analyzed instructions are machine instructions, and merging the instructions includes performing a register rename process and generating internal instructions corresponding to the machine instructions to generate the optimized internal instruction. In another embodiment, the analyzed instructions may be internal instructions, so that merging the instructions does not require converting the instructions into internal instructions prior to generating the optimized internal instruction.

In operation 34, the optimized internal instruction is stored as one internal instruction. For example, when an issue queue 11 has a plurality of slots and each slot is configured to store one internal instruction, the optimized internal instruction may be stored in only one slot in the issue queue 11. Accordingly, when a processor analyzes internal instructions in the issue queue to determine whether to execute multiple internal instructions in parallel, the optimized internal instruction corresponds to only one instruction analyzed by the processor.

In some embodiments, a width of the issue queue is increased to accommodate optimized internal instructions having a larger width than separate first and second internal instructions. In some embodiments, a depth of the issue queue, or a number of slots in the issue queue, is decreased relative to an issue queue having a width corresponding only to a single instruction, as opposed to an optimized internal instruction, to maintain a total data size of the issue queue. In such an embodiment, a time for the processor to analyze all the slots in the issue queue is decreased, since the issue queue includes fewer slots. However, since one or more of the internal instructions is an optimized internal instruction, the processor is able to analyze a same number of internal instructions in spite of the decreased number of slots.

In another embodiment, the depth of the issue queue is maintained the same as the depth of the issue queue having a width corresponding to only a single instruction, such that a processor analyzing the internal instructions in the slots of the issue queue is able to analyze an increased number of total internal instructions in the same number of slots due to one or more of the slots having optimized internal instructions.

In one embodiment, placing the optimized internal instruction into the issue queue is performed in conjunction with performing register renaming on the named logical register operands in the internal instructions of the optimized internal instruction. In one embodiment a register renaming process is performed by allocating only a single target rename register to store the result of the first internal instruction and the second internal instruction of the optimized internal instruction, where the target register of the first internal instruction is the same as the target register of the second internal instruction, or where the target register of the first internal instruction is the same as the source register of an operand of the second internal instruction.

In at least one embodiment, when the second internal instruction having been combined into an optimized internal instruction reads the result of the first internal instruction of the optimized internal instruction, the common target register is not named as a source register and represents an additional implicit operand that is not stored in the optimized internal instruction separately as a source operand, but which is supplied as a source operand to the second internal instruction when the second internal instruction is executed, or when the optimized internal instruction is executed.

In operation 35, a first internal instruction of the optimized internal instruction is executed. A processor may read the optimized internal instruction and may recognize first and second internal instructions located within the optimized internal instruction. The first and second internal instructions may be arranged in such a way as to have an order of execution recognized by the processor. For example, in one embodiment, a code corresponding to a first internal instruction may be located in more significant bits relative to a code corresponding to a the second internal instruction.

In operation 36, the second internal instruction of the optimized internal instruction is executed after executing the first instruction. In embodiments of the present disclosure, the first and second internal instructions are executed in the same order in which the internal instructions were arranged in an instruction stream prior to being merged into the optimized internal instruction. For example, if the first internal instruction is upstream from the second internal instruction, indicating that the first internal instruction would be executed first if the internal instructions were executed in order, then the first internal instruction would be executed first in the optimized internal instruction.

In one embodiment, first and second machine instructions are optimized to generate the optimized internal instruction, and the first and second internal instructions are executed in blocks 35 and 36 by generating first and second internal instructions from the optimized internal instruction corresponding to the first and second machine instructions and executing the first and second internal instructions separately, such as in separate operation cycles. In another embodiment, first and second internal instructions are optimized to form the optimized internal instruction to be stored as a single instruction, and the optimized internal instruction is executed by generating the first and second internal instructions and executing the first and second internal instructions separately, such as in separate operation cycles.

In yet another embodiment, the first and second internal instructions are executed in blocks 35 and 36 by executing the optimized internal instruction twice, where the optimized internal instruction includes a first internal instruction portion corresponding to the first internal instruction and a second internal instruction portion corresponding to the second internal instruction. In this embodiment, the first internal instruction portion is executed the first time the optimized internal instruction is executed, and the second internal instruction portion is executed the second time the optimized internal instruction is executed.

In yet another embodiment, the first and second internal instructions are executed in blocks 35 and 36 by executing the optimized internal instruction once instead of generating two separate internal instructions. In this embodiment, the optimized internal instruction includes a first internal instruction portion corresponding to the first internal instruction and a second internal instruction portion corresponding to the second internal instruction, and the second internal instruction portion is executed immediately after the first internal instruction portion without generating separate internal instructions.

Embodiments of the present disclosure encompass an instruction set architecture, including a RISC architecture, in which functions of a system, such as arithmetic functions, are divided into multiple internal instructions for processing purposes. For example, in embodiments related to a RISC architecture, each instruction may be limited to one memory cycle, so a function that would require multiple memory cycles, such as an arithmetic function, may be divided into multiple internal instructions, such as a register load instruction and a data processing instruction, where data processing is defined as manipulating data that has been loaded to a memory location, such as a register. In embodiments of the present disclosure, while the processor may reduce a depth of an issue queue by optimizing RISC internal instructions, the processor may still recognize the separate RISC-compatible internal instructions in the optimized internal instruction when executing the optimized internal instruction.

Figure 5:
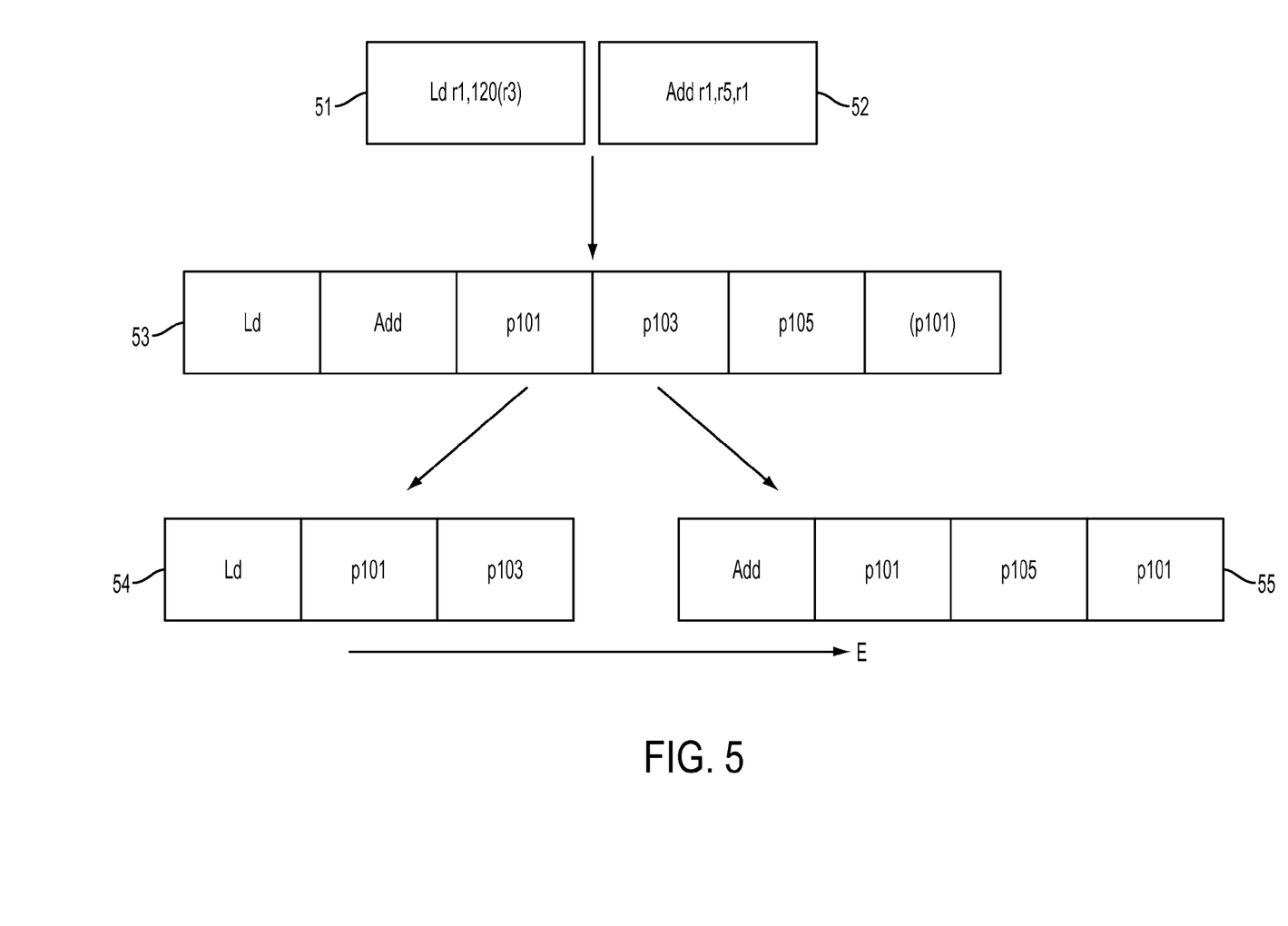
FIG. 5 depicts graphically the optimization and execution of internal instructions according to one embodiment of the disclosure.

FIG. 5 illustrates an example of merging instructions to form an optimized internal instruction, and executing the optimized internal instruction or separate internal instructions, according to embodiments of the present disclosure. Referring to FIG. 5, first and second machine instructions 51 and 52 are analyzed to determine whether they may be optimized. The first machine instruction 51 is configured to control a processor to load a value into register r1 based on an address at register r3 and a constant, 120. The second machine instruction 52 is configured to control a processor to load a value into register r1 based on the sum of the contents of registers r1 and r5. In other words, the second machine instruction 52 is configured to process the contents of the register r1 by performing an add function on the contents of the register r1.

When it is determined that the first and second machine instructions 51 and 52 are eligible to be optimized, the first and second machine instructions 51 and 52 are merged to form the optimized internal instruction 53. It is understood that although additional processes, such as a register rename process, are omitted from the depiction in FIG. 5, additional processes may be included or inherent in the optimization and execution of the machine instructions 51 and 52. The optimized internal instruction 53 includes internal instruction portions corresponding to each of the first and second machine instructions 51 and 52.

FIG. 5 shows the optimized internal instruction 53 after register renaming has been performed, replacing logical register specifiers r1, r3, and r5 with physical rename registers p101, p103 and p105, respectively. In particular, the optimized internal instruction 53 includes internal instructions to load to physical location 101, corresponding to register r1, a value corresponding to an address at physical location p103, corresponding to the register r3 plus the constant, 120. The optimized internal instruction 53 further includes internal instructions to add the contents of physical location p105, corresponding to register r5, with the contents of physical location p101, corresponding to the register r1, and to store the contents in physical location p101.

For example, in embodiments in which the first and second machine instructions 51 and 52 are eligible for optimization only when the second machine instruction 52 accesses and replaces the data from the same register as the destination register of the first machine instruction 51, the optimized internal instruction 53 may omit the operand data p101 (the omitted data indicated by parentheses) at the end of the second instruction portion of the optimized internal instruction 53, thereby reducing a size of the optimized internal instruction 53.

Although one embodiment of an optimized internal instruction 53 is illustrated in FIG. 5, it is understood that embodiments of the present disclosure encompass optimized internal instructions having different contents and organization. For example, in one embodiment, a separate data location may be provided for the destination or register of the second operation of the optimized internal instruction. In another embodiment, a separate data location may be provided for each operand of the second operation of the optimized internal instruction, regardless of whether the operand is the same as the target destination or register of the first instruction portion.

In one embodiment of the present disclosure, the optimized internal instruction 53 is executed by executing two separate internal instructions 54 and 55. A first internal instruction 54 may correspond to the first machine instruction 51, and a second internal instruction 55 may correspond to the second machine instruction 52. The first and second internal instructions 54 and 55 are executed in the same order as the first and second machine instructions 51 and 52 would have been executed based on the original positions of the first and second machine instructions 51 and 52 in an instruction stream, as indicated by the arrow E.

In one embodiment, executing the first and second internal instructions 54 and 55 includes dividing the optimized internal instruction 53 into separate internal instructions 54 and 55 and executing each of the separate internal instructions 54 and 55 in separate operation cycles. In another embodiment, executing the first and second internal instructions 54 and 55 includes executing the optimized internal instruction 53 twice, executing the first portion of the optimized internal instruction 53 that corresponds to the first internal instruction 54 the first time the optimized internal instruction 53 is optimized, and executing a second portion of the optimized internal instruction 53 corresponding to the second internal instruction 55 the second time the optimized internal instruction 53 is executed.

In one embodiment, one or both of an operand source location and a destination location is omitted from the second portion of the optimized internal instruction 53 corresponding to the second internal instruction 55, and a processor, such as the instruction execution unit 27 of FIG. 2, supplies the destination location of the first portion of the optimized internal instruction 53 corresponding to the first internal instruction 54 as one or both of the omitted operand source location and destination location of the second internal instruction 55.

In embodiments of the present disclosure in which the first and second machine instructions 51 and 52 include a load instruction and data processing instruction that uses a loaded operand of the load instruction, a processor may recognize the first part 54 of the optimized internal instruction 53 as corresponding to the load instruction and the second part 55 of the optimized internal instruction 53 as corresponding to the data processing instruction. The processor may divide the optimized internal instruction 53 into the first internal instruction 54 and the second internal instruction 55 to execute the first and second internal instructions 54 and 55 separately. Alternatively, the processor may execute the optimized internal instruction 53 twice, while executing only one of the portions of the optimized internal instruction 53 corresponding to one of the internal instructions 54 and 55 each time the optimized internal instruction 53 is executed.

In one embodiment, the optimized internal instruction 53 is executed instead of operating separate internal instructions 54 and 55 in separate operation cycles. In other words, in one embodiment, separate internal instructions 54 and 55 are not generated based on the optimized internal instruction 53. Instead, the optimized internal instruction 53 may execute the first internal instruction portion and second internal instruction portion of the optimized internal instruction 53 sequentially in a same operation cycle.

Figure 6:
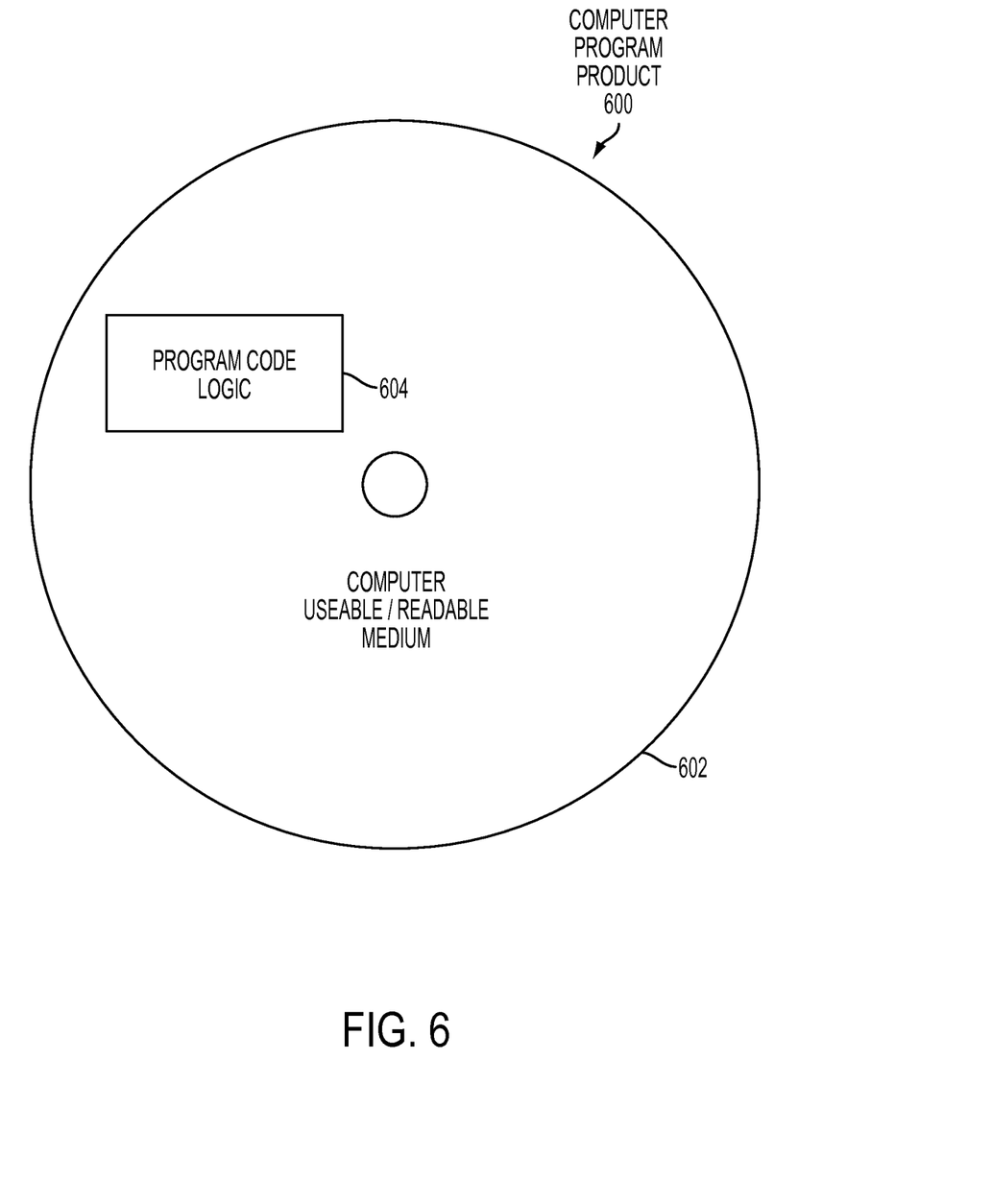
FIG. 6 depicts a computer program product in accordance with one embodiment.

As described above, embodiments can be embodied in the form of computer-implemented processes and apparatuses for practicing those processes. An embodiment may include a computer program product 600 as depicted in FIG. 6 on a computer readable/usable medium 602 with computer program code logic 604 containing instructions embodied in tangible media as an article of manufacture. Exemplary articles of manufacture for computer readable/usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing the invention. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing the invention. When implemented on a general-purpose microprocessor, the computer program code logic 604 segments configure the microprocessor to create specific logic circuits.

Technical effects and benefits of embodiments of the present disclosure include reducing a number of instructions analyzed by a processor for processes such as parallel processing, reducing a number of internal instructions stored in memory, such as in an issue queue, and reducing a number of steps performed by a processor to execute internal instructions. For example, in an embodiment in which a processor is configured to perform parallel processing, and the processor analyzes instructions in a stream of instructions stored in an instruction queue or in an issue queue, the processor may form optimized internal instructions according to above-described embodiments to result in fewer internal instructions for the processor to analyze for parallel processing, reducing latency in a system including the processor. Other technical effects and benefits may result from systems, methods, and computer program products according to embodiments of the present disclosure, and the scope of the invention is not limited to any one of the above effects or benefits.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The above embodiments were chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program internal instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method comprising:
   determining that two or more instructions of an instruction stream are eligible for optimization, the two or more instruction including a memory load instruction and a data processing instruction to process data based on the memory load instruction;
   merging, by a processor, the two or more instructions into a single optimized internal instruction, wherein the single optimized internal instruction comprises a single stored rename register identifier;
   storing the single optimized internal instruction in a single slot in an issue queue; and
   executing the single optimized internal instruction to perform a memory load function and a data processing function corresponding to the memory load instruction and the data processing instruction, the executing including executing the memory load instruction followed by the data processing instruction.

2. The computer-implemented method of claim 1, wherein executing the single optimized internal instruction includes executing the single optimized internal instruction instead of two or more separate internal instructions corresponding to the two or more instructions of the instruction stream.

3. The computer-implemented method of claim 1, wherein executing the single optimized internal instruction further includes fetching the single optimized internal instruction from the queue and generating from the single optimized internal instruction two or more separate internal instructions corresponding to the memory load instruction and the data processing instruction.

4. The computer-implemented method of claim 1, wherein determining that the two or more instructions are eligible for optimization includes determining that a target destination of the memory load instruction is the same as an operand location of the data processing instruction.

5. The computer-implemented method of claim 1, wherein executing the single optimized internal instruction further includes executing the single optimized internal instruction twice, executing the memory load instruction the first time the single optimized internal instruction is executed, and executing the data processing instruction the second time the single optimized internal instruction is executed.

6. A computer-implemented method comprising:
   determining that two or more instructions of an instruction stream are eligible for optimization, the two or more instruction including a memory load instruction and a data processing instruction to process data based on the memory load instruction;
   merging, by a processor, the two or more instructions into a single optimized internal instruction, wherein the single optimized internal instruction comprises a single stored rename register identifier;
   storing the single optimized internal instruction in a single slot in an issue queue; and
   executing the single optimized internal instruction to perform a memory load function and a data processing function corresponding to the memory load instruction and the data processing instruction, the executing including executing the memory load instruction followed by the data processing instruction,
   wherein merging the two or more instructions into the single optimized internal instruction includes forming the single optimized internal instruction to have a first instruction portion corresponding to a first one of the two or more instructions and a second instruction portion corresponding to a second one of the two or more instructions, and
   wherein merging the two or more internal instructions into the single optimized internal instruction includes omitting from the second instruction portion data corresponding to at least one of an operand location and a destination of the second one of the two or more instructions that is the same as a target destination of the first one of the two or more internal instructions.

* * * * *